Patented July 7, 1942

2,289,125

UNITED STATES PATENT OFFICE 2,289,125

THERAPEUTIC AGENT FOR THE TREATMENT OF FUNGUS INFECTION

Wilfred B. Keil, Iowa City, Iowa

No Drawing. Application April 18, 1938,
Serial No. 202,757

3 Claims. (Cl. 167—58)

The present invention is directed to a therapeutic agent adapted for the treatment of fungus infections of the type known as dermatomycosis, epidermomycosis and epidermophytosis, such infections being also commonly designated as "athlete's foot." This disease is caused by a fungus belonging to either the Microsporan or the Trichophyton genus. Although the species "Trichophyton" most often causes the infection, there are several other species which are capable of causing the infection.

The infection produced by fungi of the character above set forth are technically called "Microsporosis" or "Trichophytosis" depending upon the family to which the species belong. While "athlete's foot" may appear in various places, generally it makes its initial appearance in the third or fourth interdigital space. The subjective symptoms are itching, blisters that break down, burning and numbness. In general, it may be stated that usually the skin becomes red and may develop a scalded appearance and thereafter a white dry or moist scale develops accompanied by itching. Later the infected skin tissue may crack between and beneath the toes. The infection is more troublesome in hot weather and is aggravated by perspiration.

The fungi causing "athlete's foot" live on dead organic material and grow vigorously on such substances as wool, silk, hair and shedded skin. The fungi are killed if exposed to a temperature of about 170° F. for ten minutes. However, a temperature less than the critical amount above set forth and/or dampness is conducive to the growth of the fungi.

The present invention is directed to a composition comprising a fungus-destroying agent having a keratolyzing and desquamating or peeling action on the skin tissue, together with a material to relieve the irritation produced by the fungus-destroying agent, and an additional ingredient adapted to exert a toughening and healing action on the skin tissue remaining after peeling has occurred. The invention also resides broadly in the provision of a material which may be used to treat a tissue after the fungus-destroying medium has desquamated or peeled off the infected skin tissue, such agent comprising a tannin-containing compound exerting a toughening and healing action on the skin tissue. The keratolyzing and desquamating agent of the present invention may comprise any of those well known in the prior art, but it is preferable to use, because of the more satisfactory results obtained, a mixture of sodium hyposulfite in anhydrous form, paraformaldehyde and thymol. However, to any and all of the mixtures of the keratolyzing and desquamating agent a tannin compound is added, said compound in the preferred form of the invention being tannic acid.

While any material well known in the prior art may be used to relieve the irritation caused by the fungus-destroying medium, the preferred material is one which will produce boron ions. It may be stated that most satisfactory results have been attained when using boric acid. Broadly, any of the boric acids may be used and any of the soluble alkali borates, such as for example sodium borate, all of these being well recognized as functioning to relieve irritation produced by the fungus-destroying medium. While the therapeutic agent of the present invention may comprise a mixture of the materials above set forth, even in solution but preferably in the form of fine powder, usually these ingredients are distributed in a carrier, such as zinc oxide or zinc stearate, corn starch or any suitable talcum powder, the latter being produced from the anhydrous magnesium silicates. A carrier which has produced satisfactory results is zinc oxide in a very minor proportion and a predominant proportion of corn starch. For the corn starch there may be substituted zinc stearate and talcum.

The following is an example of a therapeutic agent suitable for carrying out the present invention:

Table A

| | Grams |
|---|---|
| Sodium hyposulfite in anhydrous hypo form | 10 |
| Boric acid—fine powder | 200 |
| Tannic acid—fine powder | 20 |
| Paraformaldehyde | 2 |
| Thymol—fine powder | 1 |
| Zinc oxide | 67 |
| Corn starch | 700 |
| | 1000 |

In the above formula the sodium hyposulfite, the paraformaldehyde and the thymol function as the keratolyzing and desquamating agent, the boric acid as the material relieving irritation produced by the keratolyzing and desquamating agent and the tannic acid functioning to exert a toughening and healing action on the skin tissue and further to restore to normal the tissue remaining after peeling has occurred. The zinc oxide and corn starch function as a carrier.

The present research carried on over a long period of time discloses that the proportions above set forth give the most satisfactory results. However, it is recognized that the above proportions may be varied and still come within the spirit of the present invention.

As illustrative how the proportions may be varied the following composition is set forth:

Table B

| | Grams |
|---|---|
| Anhydrous sodium hyposulfite | 5 to 20 |
| Boric acid | 100 to 300 |
| Tannic acid | 10 to 80 |
| Paraformaldehyde | 1 to 10 |
| Thymol | 1 to 10 |
| Zinc oxide | 50 to 100 |
| Corn starch_____Quantity to make | 1000 |

The above mixture is preferably made in powder form and dusted on to the infected area. It may be suspended in water just previous to the application and applied to the infected area followed by dusting on the powder. In some cases it may be desirable to first dust on the powder and thereafter to bathe in a suspension, but the preferred order of steps where there is a combined liquid treatment and powder treatment is to first bathe in a suspension of the herein disclosed therapeutic agent and later on dust on the powder.

A composition made in accordance with Table A may be suspended in water in the proportion of ¼ of an ounce of the mixture to 2 gallons of water and used as a treatment-suspension. Obviously, the amount of powder added to the water may be considerably varied. In some cases it may be less than a ¼ of an ounce and in other cases considerably greater. Where it is desired to produce a concentrated suspension as much as anywhere to a ¼ of an ounce to 2 ounces may be added to 2 gallons of water, and even more where the circumstances demand it. It is equally obvious that for delicate skins the treatment-suspension should contain less than a ¼ of an ounce of the mixture to 2 gallons of water.

The manner in which the therapeutic agent of the present invention may be utilized will be clear from the following.

The infected area should be bathed in a suspension of the mixture in water and thereafter the feet should be rubbed thoroughly with a rough towel to remove as much as possible of the fungus substance. In some cases a dull knife may be used to remove the softened tissue. The powder in suspension functions to soften the hard hyperkeratotic tissue. After the feet have been so treated it is advisable to dust the powdered therapeutic agent on to the so treated skin area. While the powder can be applied shortly after the liquid treating step and the removal of the softened tissue, in many cases it is best to allow six hours to elapse after the treatment with the suspension and then to apply the therapeutic agent in powdered form to the infected area. In other words, the suspension may be applied at night just before the patient retires and the next morning the powder may be applied to the infected area and also in the socks which the patient wears.

It is desirable that the sodium hyposulfite used in the mixture be anhydrous. This eliminates moisture in the mixture and thereby inhibits the formation of lumps. The sodium hyposulfite may be made anhydrous by exposing the same to room temperature for about 48 hours and then placing the powder in an oven at an initial temperature of 50° and then gradually increasing the heat to about 100° during the period of one hour.

As one of the fungus-destroying agents it has been stated that it is desirable to use paraformaldehyde in the form of fine powder. This material is a solid melting at about 150° C., soluble in water but insoluble in alcohol or ether and well known for its antiseptic properties. However, it is believed to be novel to combine the paraformaldehyde in a powder form with a tannin-containing compound, such as tannic acid, functioning to toughen and heal the skin tissue after the paraformaldehyde has effected the destroying of the fungi.

When the therapeutic agent of the present invention is used in a powdered form paraformaldehyde is converted by body heat into formaldehyde, which is a gas, and this is liberated under such conditions as to be very effective in penetrating the superficial cells of the skin and its appendages to thereby kill the fungi. A powder mixture containing tannic acid and paraformaldehyde may also be dissolved in water to function as a very effective therapeutic agent having antiseptic and escharotic properties.

It may be also pointed out that the tannic acid functions to toughen the skin tissues remaining after the infected hardened fungus substance has been removed. In other words, after the infected area has been treated with the therapeutic agent of the present invention in solution and suspension form and the hyperkeratotic tissue which is white or yellowish white in color removed, the tannin component of the mixture present in the solution functions to toughen and restore to normal the remaining tissue, or there may be dusted on to the so treated infected area an additional amount of the therapeutic agent containing a tannin compound and in that manner the tannin component present in both stages in which the therapeutic agent is used functions to toughen and restore to normal the skin tissue.

It may be pointed out that in the early stages of the infection small blisters similar to burns appear and then break down. This is a very troublesome stage and it is at this stage where the treatment with the soluble tannin compound, preferably soluble in an aqueous suspension, such as water, is invaluable. Irritation is present in the infected area and it is highly urgent that the tissue be restored to normal as soon as possible after the tissue has been subjected to the action of the fungus destroying ingredients, such as anhydrous hyposulfite and/or thymol and/or paraformaldehyde.

It has been pointed out that a soluble tannin compound, as for example tannic acid, is one of the essential components of the therapeutic agent of the present invention.

It may be pointed out that the tannic acid used in the present invention may be any of its well known forms, such as gallotannic acid, the latter being a yellow amorphous powder soluble in water. Any organic tannic compound may be used which will break down in solution to form tannic acid. In other words, it is within the performance of the present invention to provide a powder containing a tannic-containing ingredients which will produce an in-situ solution of tannic acid. Having once disclosed the use of a tannin-containing compound, such as tannic acid, as the ingredient of the therapeutic agent adapted for the treatment of "athlete's foot" it is within the province of those skilled in the chemical art to easily provide equivalents thereof and the present invention is directed to the use of such equivalents.

It is probable that some of the paraformaldehyde combines with the tannin to form what is known as tannoform or tannin-formaldehyde. Therefore, one of the effective ingredients of the therapeutic agent of the present invention is the tannin-formaldehyde compound. The ingredients of the therapeutic agent may be so proportioned that there is present not only tannic acid, which functions to toughen, heal and restore the desquamated tissue, but also tannin-formaldehyde. In other words, the tannic acid and the formaldehyde will exist in the powder form as separate ingredients. These will act either in such a form when applied to the infected area or in the presence of mixtures, a small proportion thereof may be converted into a tannin-formaldehyde compound and the effective agents will then be tannic acid, formaldehyde and tannin-formaldehyde. When a suspension of the mixture is used a proportion of the formaldehyde combines with tannic acid to form tannin-formaldehyde but leaving a large excess of tannic acid. Therefore, while in the solution form the most effective toughening and healing agent is tannic acid, the tannin-formaldehyde also functions to serve the same purpose. If it is desired the proportions of formaldehyde may be increased so as to increase the proportion of the tannin-formaldehyde material which will not only exert a toughening and healing action on the treated tissues but will also act as an antiseptic and astringent.

It may be pointed out that in preparing the composition set forth in Table A the sodium hyposulfite in anhydrous form, paraformaldehyde in powder form and tannin in a powder form are first mixed together and thereafter the boric acid is added, then the filler and carrier, such as zinc oxide and corn starch, are added. These materials are placed in a mechanical revolving mixer which will also function if necessary to reduce the constituents to a fine enough stage to pass through 80 mesh. It is desirable that there be a large excess, as for example, not less than 600 grams of the filler used.

The therapeutic agent of the present invention is free of any greasy component and is easily applied in powder form. The therapeutic agent may be used in solution form, as hereinbefore set forth, may be sprinkled in all moist places, such as a locker, bathroom, linoleum cracks and the like. It may be applied to socks, shoes and all athletic equipment in order to inhibit the growth of the fungi present on damp floors, locker cracks, socks and shoes.

While it is preferred to use paraformaldehyde, and especially so when the therapeutic agent is used in the powdered form, other forms of formaldehyde may be used, such as solutions of formaldehyde and the like, such forms of formaldehyde having fungi-destroying properties and being capable of combining with the tannin.

It may be stated that the disease known as "athlete's foot" occurs in three types, as follows: (1) That type where masceration of the skin occurs; (2) the vesicular type and (3) hyperkeratosis. These three types may exist independently, or all types may occur during the course of the infection. The therapeutic agent of the present invention can be used for the treatment of any one of the above types, or all of them.

What is claimed is:

1. A therapeutic agent for the treatment of fungus infections of the type of dermatomycosis, epidermomycosis and epidermophytosis, comprising a mixture of alkali anhydrous hyposulfite 5 to 20 grams, boric acid 100 to 300 grams, tannic acid 10 to 80 grams, paraformaldehyde 1 to 10 grams and substantially less than the amount of tannic acid, thymol 1 to 10 grams and a filler and carrier therefor.

2. A therapeutic agent for the treatment of fungus infections of the type of dermatomycosis, epidermomycosis and epidermophytosis, comprising a mixture of 10 grams of sodium hyposulfite, 200 grams of boric acid, 20 grams of tannic acid, 2 grams of paraformaldehyde and 1 gram of thymol, together with a filler and carrier therefor.

3. A therapeutic agent for the treatment of fungus infections of the type of dermatomycosis, epidermomycosis and epidermophytosis, comprising a mixture of alkali hyposulphite 5 to 20 grams, an irritation-relieving agent selected from the group consisting of boric acid and soluble alkali borates 100 to 300 grams, tannic acid 10 to 80 grams, formaldehyde in an amount equivalent to 1 to 10 grams of paraformaldehyde and substantially less than the tannic acid, thymol 1 to 10 grams, and the filler and carrier therefor.

WILFRED B. KEIL.